(12) United States Patent
Yamazaki et al.

(10) Patent No.: US 6,661,130 B2
(45) Date of Patent: Dec. 9, 2003

(54) LINEAR MOTOR

(75) Inventors: Tsunehiko Yamazaki, 2443, Omoteyama 3-chome, Tenpaku-ku, Nagoya-shi, Aichi-ken (JP); Kohei Ohnishi, Kanagawa-ken (JP); Naoomi Miyagawa, Gifu-ken (JP); Toshihiko Inoue, Aichi-ken (JP)

(73) Assignee: Tsunehiko Yamazaki, Aichi-ken (JP)

( * ) Notice: Subject to any disclaimer, the term of this patent is extended or adjusted under 35 U.S.C. 154(b) by 68 days.

(21) Appl. No.: 10/228,570

(22) Filed: Aug. 26, 2002

(65) Prior Publication Data

US 2003/0042799 A1 Mar. 6, 2003

(30) Foreign Application Priority Data

Aug. 29, 2001 (JP) ........................................ 2001-259104
Jun. 11, 2002 (JP) ........................................ 2002-170036

(51) Int. Cl.[7] ............................ H02K 41/00; H02K 9/00
(52) U.S. Cl. .............................. 310/12; 310/13; 310/15
(58) Field of Search .............................. 310/12, 13, 15

(56) References Cited

U.S. PATENT DOCUMENTS

| | | | | | |
|---|---|---|---|---|---|
| 6,417,914 | B1 | * | 7/2002 | Li | 355/75 |
| 6,469,406 | B1 | * | 10/2002 | Hwang | 310/12 |
| 6,472,779 | B2 | * | 10/2002 | Hwang | 310/12 |
| 6,478,838 | B2 | * | 11/2002 | McSweeney | 55/467 |

* cited by examiner

*Primary Examiner*—Nestor Ramirez
*Assistant Examiner*—Iraj A. Mohandesi
(74) *Attorney, Agent, or Firm*—Duane Morris LLP

(57) ABSTRACT

A linear motor has a stationary member shaped as a channel and a moving member therein, with a magnet and an armature producing force for displacing the moving member along the channel. A first air flow path for cooling is defined along the path of the moving member in the channel. The moving member can have channels allowing cooling air to flow through. The channel can be closed over by a cover band passing through a slit in the moving member and closed or lifted by rollers on the moving member. The channel can be supplied with forced air flow by a blower and/or an exhaust fan, and preferably includes a filter for excluding metallic particles from the first air flow path.

16 Claims, 11 Drawing Sheets

(a)

(b)

ered in a stationary
LINEAR MOTOR

BACKGROUND OF THE INVENTION

This invention relates to a linear motor useful for moving and driving movable members of various kinds of machine tools, including laser beam machines.

A recent proposal concerning various kinds of machine tools, including laser beam machines, is to adopt a linear motor for feeding and driving a movable member, such as a machining head, with respect to a workpiece.

When the movable member of a machine tool is moved and driven with a linear motor, substantial heat is generated, such as heat owing to eddy currents generated in a stationary member and a moving member of the linear motor. Joule heating also is generated in the electromagnetic coil(s). This heat can cause thermal deformation of structural or movable members.

The heat is not dissipated uniformly over the whole machine tool. The largest temperature increase typically occurs at the heat generating portion and its vicinity. Heating is less at portions that are far from the heat generating portion. This uneven heating decreases machining efficiency when machining workpieces.

The object of the present invention is to provide a linear motor having good cooling efficiency, taking the above-mentioned circumstances into consideration.

SUMMARY OF THE INVENTION

The invention is linear motor having a stationary member and a moving member located so as to face each other. The moving member moves along the stationary member, due to force generated between a magnet and an armature. The linear motor comprises:
  a first air flow path for cooling formed along one of the magnet and the armature, located on the stationary member side; and
  a first air supply means through which said first air flow path for cooling is supplied with a flow of air.

Provided that the linear motor is effectively cooled so as to minimize temperature differences in the machine tool, machining with high accuracy is possible.

According to an aspect of the invention, said moving member is moved in said first air flow path for cooling.

In this way, both the stationary member and the moving member can be cooled by the flow of air, and machining with even higher accuracy is possible.

According to the invention, a further air flow path for cooling is formed in said moving member so as to communicate with said first air flow path for cooling. The first air flow path for cooling is supplied with air flow by said first air supply means, and part of this air flow proceeds into said further air flow path for cooling so as to cool said magnet or said armature arranged on the moving member.

In this way, the magnet located on the moving member side (or the armature if it is located on the moving member) can be cooled.

In an embodiment of the inventive linear motor, the armature is located on said moving member side, and the magnet is located on said stationary member side.

The armature located on the moving member side or the magnet located on the stationary member side can be cooled.

In another embodiment, the stationary member has a slender shape, the moving member is shaped as a cylinder and fitted on said stationary member with clearance or play to permit movement, the magnets form a magnet row or row of magnetic poles along a longitudinal direction of said stationary member, the armatures form armature rows having two or more rows of armature poles facing said magnet rows, and, said further air flow path for cooling passes between two rows of said armature rows adjacent to each other.

Effective cooling is possible although the linear motor has two or more armature rows, although substantial joule heat may be generated by the multiple armature rows.

A first air supply means can be located on each of two opposite ends of said first air flow path for cooling.

Placing first air supply means on both ends increases the air flow quantity along the first air flow path for cooling.

According to the invention, the linear motor can have a moving member with a coil core, on which an electromagnetic coil is provided, running in a movement area in the shape of a channel formed by or in a stationary member having a magnet row. The coil and the magnet row move and drive a movable member carried on said moving member. The linear motor has a first air flow path for cooling, formed in said movement area. Air streaming along the first air flow path effectively cools the magnet row of the stationary member and the electromagnetic coil and the coil core of the moving member.

A forced air supply means is provided on at least one end of the first air flow path and supplies air for cooling.

Air forced to stream through the first air flow path for cooling removes heat generated at the surface of the stationary member or the moving member of the linear motor.

A second air flow path for cooling can be formed between a supporting member for supporting a magnet row of said stationary member and said magnet row. In that case, a second air supply means for supplying air for cooling said magnet row is provided, in said second air flow path for cooling.

The second air flow path for cooling is also formed between the magnet row of the stationary member of the linear motor and the supporting member supporting this. Air streams along the second air flow path for cooling the stationary member by the second air supply means, providing for more effective cooling of the stationary member.

The first air supply means has at least one of an air blower for intake, provided at one end of said first air flow path, and an air blower for exhaust, provided at the other end of said first air flow path.

Then, air for cooling is forced to stream through the first air flow path by one or both of the air blower for intake or the air blower for exhaust.

According to another aspect, a third air flow path for cooling is formed in a coil core of said moving member so as to penetrate said coil core in its piling direction and so as to stream air for cooling.

The third air flow path is formed in the coil core of the moving member, and cools the moving member.

A pair of guide flow paths can be formed on both sides of said piling direction of said coil core, to communicate each other and to reside in the third air flow path.

In that case, the air for cooling can be streamed through the coil core by the pair of guide flow paths, helping to cool the moving member.

The guide flow path on one side of the piling direction of the coil core preferably communicates with one part of said first air flow path, which is divided by the moving member into a front and a rear part in a moving direction of said moving member. The guide flow path on the other side of the piling direction of the coil core communicates with the other part of said first air flow path for cooling. The front and rear parts of said first air flow path communicate with each other through said guide flow paths and said third air flow path formed in said coil core.

The flow of air in the first air flow path, which path is divided into the front and the rear parts due to the moving member, is substantially unobstructed because the third air flow path traverses the moving member. Effective cooling is possible.

According to further aspects, the linear motor of the invention comprises:

- a stationary member having a channel and magnet rows respectively arranged at inner side faces of said channel, facing each other;
- a moving member for moving along said magnet rows of said stationary member;
- a cover in the shape of a band arranged so as to close over an open portion of said channel of said stationary member; and
- a first air flow path for cooling formed by said channel and said cover.

Air along the first air flow path effectively cools the stationary member and the moving member of the linear motor, the first air flow path encompassing the stationary member and the moving member using a simple structure.

A first air supply means supplies forced air to the first air flow path for cooling, such means being provided at either or both ends of said first air flow path.

The forced air streamed along the first air flow path carries along heat generated at the stationary member or the moving member, and the linear motor is effectively cooled.

In one embodiment, a slit is formed in said moving member, extending in a direction of movement of the moving member. The cover extends through the slit on a slider that permits the moving member to slide freely along with the cover passing through the slit.

In this way, the clearance between the stationary member and the cover in the slider is small. The small dimension decreases the volume of air for cooling and the amount that leaks outside, thereby cooling efficiently.

A pair of guide rollers are respectively provided at each of the opposite ends in a direction of movement of the slider. Each guide roller is positioned for guiding the cover, which contacts the guide roller in said slit. Each guide roller contacts and guides the cover up to the opening portion of said stationary member.

This structure defines and confines a small cross section of the air flow path. Thus, the quantity of cooling air that leaks to the outside around the cover is minimal.

The described first air supply means can function also as the described second air supply means. That is, the linear motor can be cooled with a single forced air supply means, making it economical.

The first air supply means preferably has an air blower and an air purifying means for removing foreign objects and purifying the air passing through the blower.

Foreign objects from the outside atmosphere, such as dust and iron powder, are thereby filtered out by the air purifying means. By keeping the inside of the air flow path clean, obstructions owing to foreign objects are prevented. Control of the linear motor is stable. Confidence in operation is improved, and the device is made practical for use in a machine tool plant where foreign objects, such as dust, are routinely present in the air.

In particular, the air purifying means can have a means for removing magnetic metallic powder. This aspect advantageously prevents abrasion of the magnets or the coil cores due to accumulations of magnetic metallic powder. This further improves operations and confidence.

One aspect of the invention is that in the inventive linear motor, the first air supply means as described is provided on the moving member. More particularly, an aspect of the linear motor is that said first air supply means supplies cooling air via an air flow along a path defined through the moving member.

BRIEF DESCRIPTION OF THE DRAWINGS

FIG. 6($b$) is view showing an air blower or the like, seen from a side of the linear motor;

DESCRIPTION OF THE PREFERRED EMBODIMENTS

Figure 1:
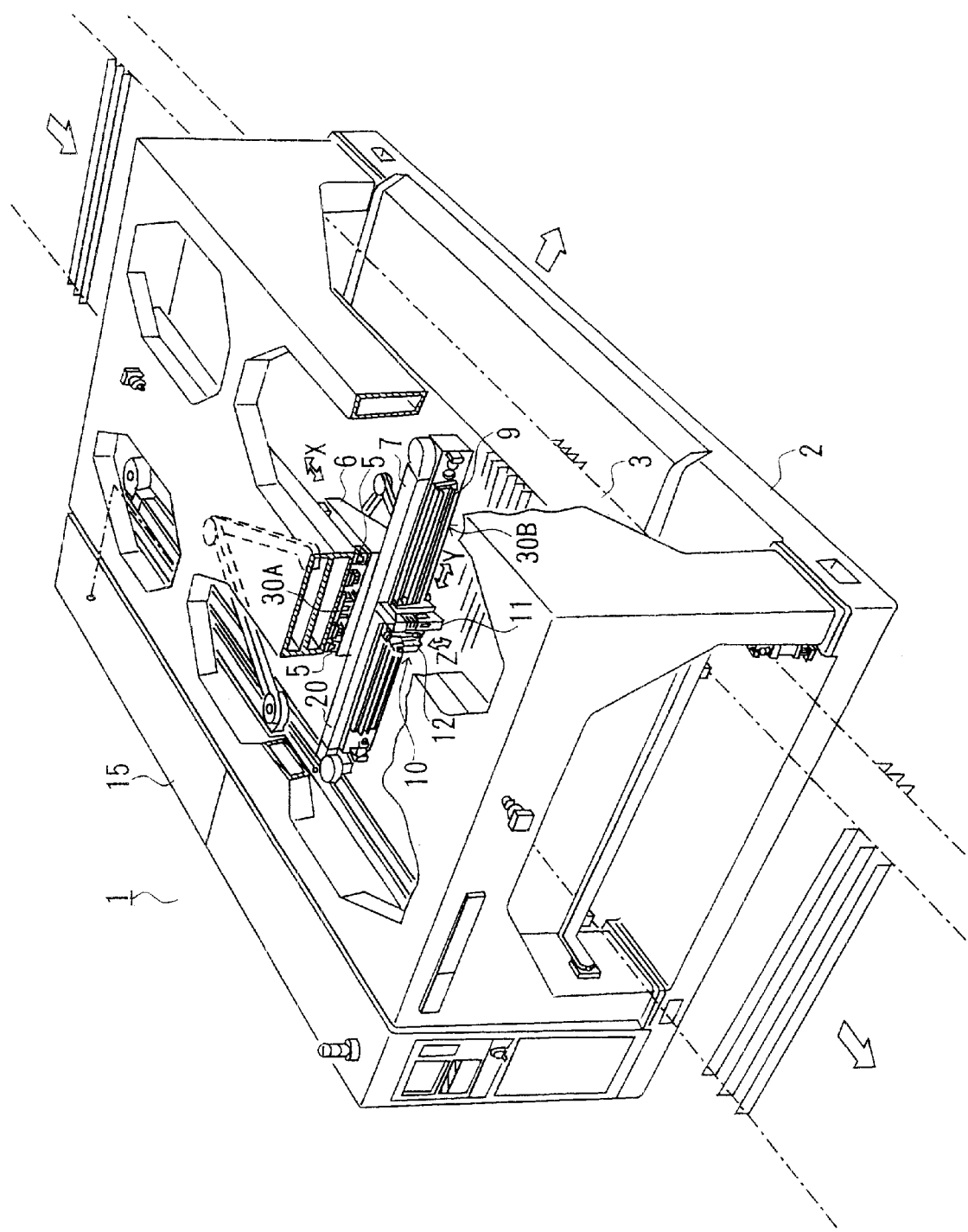
FIG. 1 is a perspective view of a laser beam machine as an example of a machine tool to which a linear motor of the present invention is applied.

Embodiments of the invention will now be explained, referring to the appended drawings. A linear motor according to the invention has a stationary member (see reference number 31 in FIG. 1 and 102 in FIG. 4) and a moving member (reference numbers 51 and 103, respectively) located so as to face each other. The motor is arranged for moving the moving member (51 and 103) along the stationary member (31 and 102), by use of forces acting between a magnet (35 and 120) and an armature (53, 54 and 130). According to the invention, a first air flow path for cooling (39, 139) is formed along a line of the magnets (35, 120) or the armature (53, 54 and 130), namely the elements located on the stationary member side. In the structure of the linear motor shown, air flow is fed through the first air flow path (39, 139) by means of a first air supply means (41 or 42, 141 or 142), to effect cooling. Details will now be explained.

Figure 2:
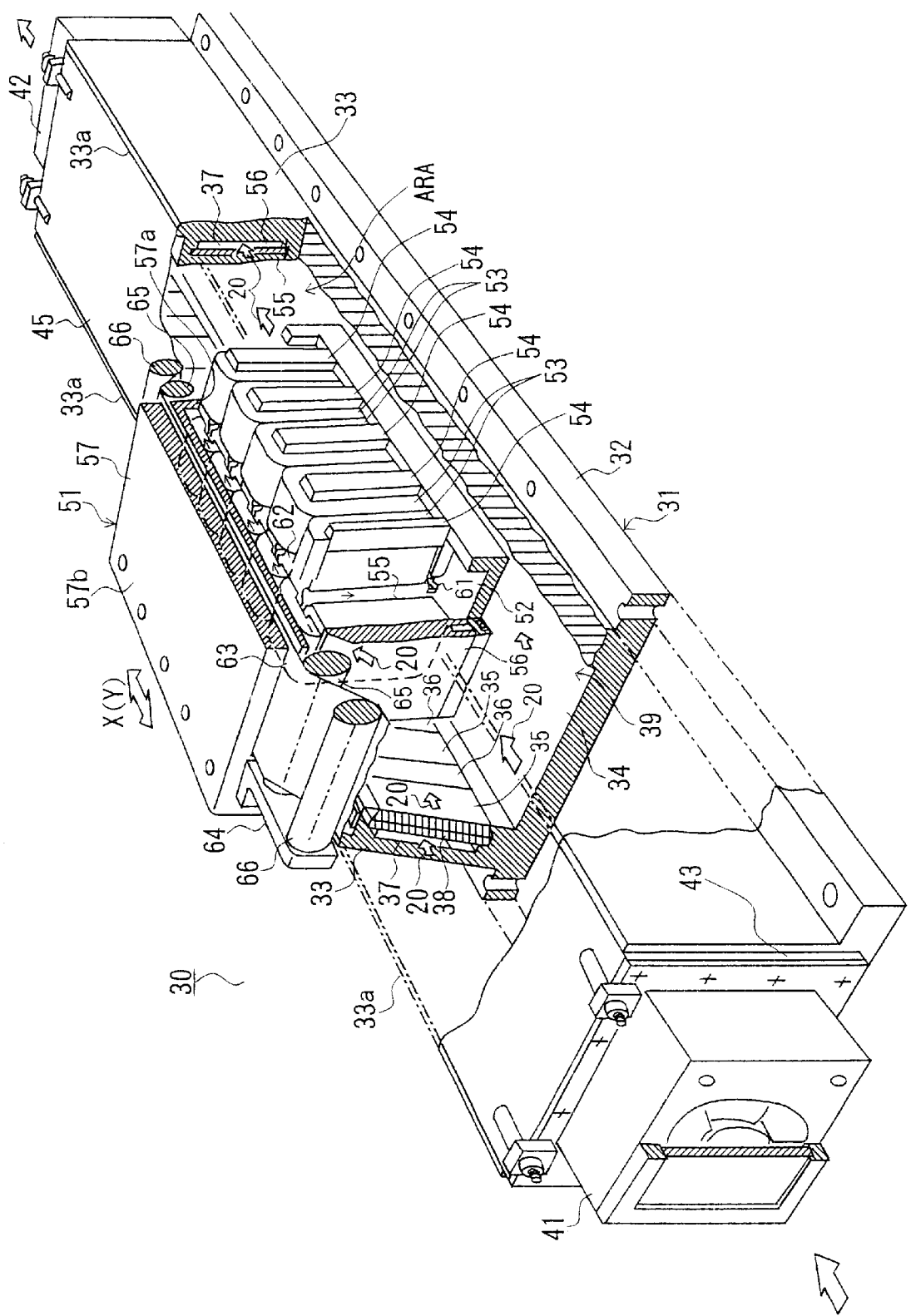
FIG. 2 is a perspective view of the linear motor according to the invention.
Figure 3:
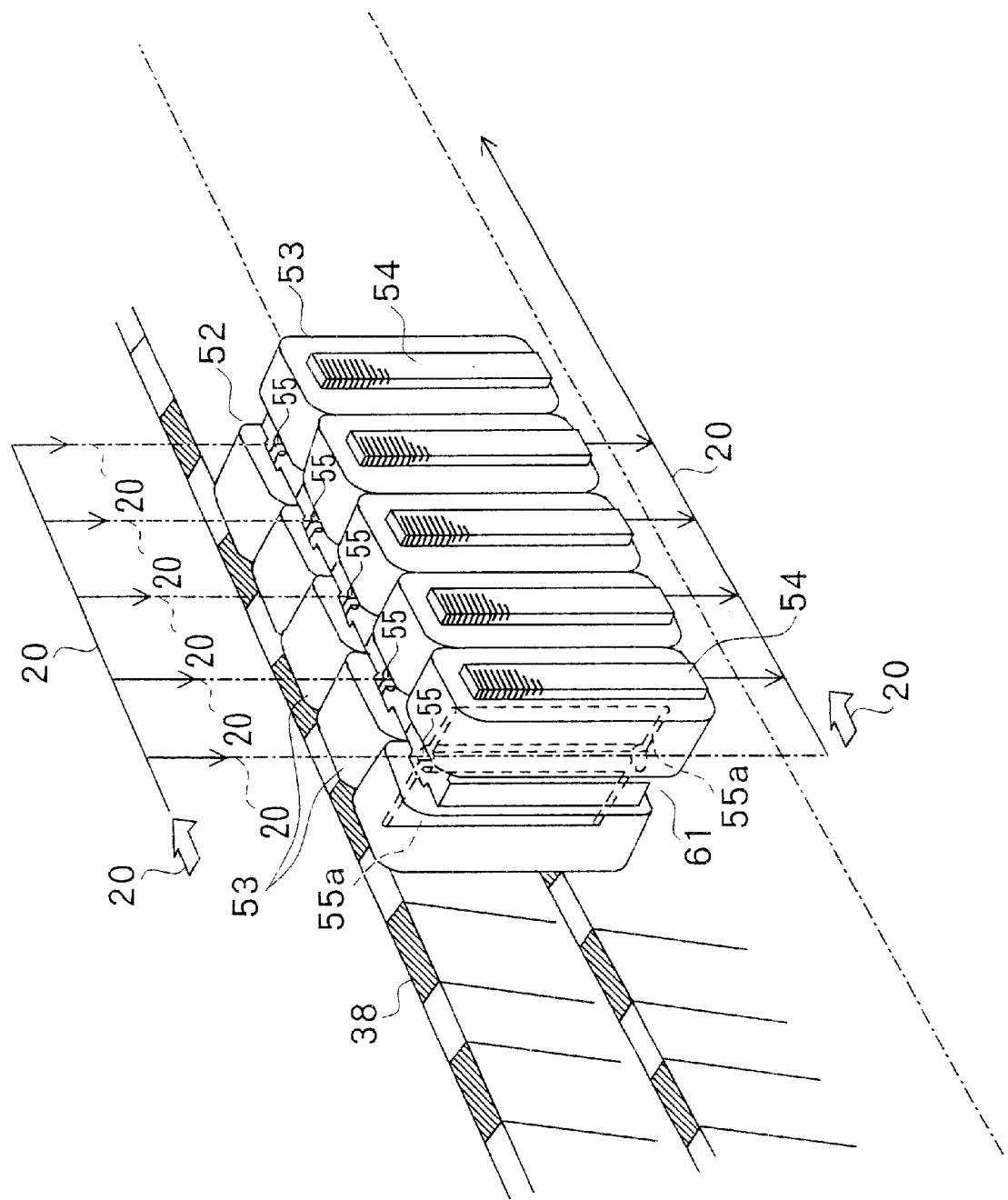
FIG. 3 is a perspective view showing air flow in a coil core portion as in FIG. 2.

A first embodiment of the present invention will be explained as shown in FIGS. 1 through 3. FIG. 1 is a perspective view of a laser beam machine as an example of a machine tool to which a linear motor of the present invention can be applied, FIG. 2 is a perspective view of the linear motor according to the invention, and FIG. 3 is a perspective view for explaining air flow in a stationary member portion of the motor as shown in FIG. 2.

As shown in FIG. 1, a laser beam machine 1 has a frame 2, provided with a table 3 (shown by a dashed line) where a workpiece to be machined (not shown) is to be placed, extending into the frame 2 in an X-axis direction. The frame 2 is provided with X-axis rails 5, 5, extending in a horizontal X-axis direction, for positioning a moving body 6 over the table 3 along the X-axis.

The moving body 6 is engaged with the X-axis rails 5, 5. The moving body 6 is supported by the rails 5, 5, and thereby suspended so as to be free to move linearly in the X-axis moving direction. A drive unit 30A defines with the supported moving body and rails, etc., a linear motor for moving, driving and positioning the moving body 6 along the X-axis rails 5. The span of movement along the X-axis direction bridges over the corresponding length of frame 2. Details of the drive unit 30A will be described hereinafter.

The moving body 6 is provided with a beam or column 7 that is elongated in the perpendicular or Y-axis direction. The beam or column 7 is provided with a Y-axis rail 9, extending perpendicular to the X-axis so as to determine a position over the corresponding width of table 3.

A head unit 10 is carried on the Y-axis rail 9, and is free to move linearly in the Y-axis direction. A drive unit 30B likewise defines a linear motor for moving, driving and positioning the head unit 10 with respect to the Y-axis rail 9. Details of the drive unit 30B will be described hereinafter.

The head unit 10 has a torch or cutter 11 capable of radiating a laser beam downward, and a Z-axis moving drive means 12 capable of moving, driving and positioning the cutter 11 in a Z-axis direction which is up and down in the direction shown in the drawing. A laser beam transmission path can be provided for transmitting the laser beam from a laser oscillating unit 15 (not shown in detail) to the cutter 11.

Both the drive unit 30A and the drive unit 30B are linear motor style drive units. There operational structures can be the same although they are different from each other in size and in the locations to which they position the head unit 10. So, both driving units 30A, 30B are collectively explained herein as a driving unit 30.

As shown in FIG. 2, the driving unit 30 comprises a stationary member 31 and a moving member 51. The stationary member 31 is fixed on the frame 2 (or on the beam or column 7—see FIG. 1), and the stationary member 31 has a guide body 32 extending in the X or the Y direction. A pair of guides 33 are formed to project from the guide body 32 at a predetermined spacing, parallel to a longitudinal direction of the guide body 32 (the direction of the arrow X or Y). A channel 34 having a U-shaped section is thereby formed by the guide body 32 and the pair of guides 33. Therefore, a positioning length ARA is available along the length of the channel 34 for moving and driving the moving member 51 in the X-axis direction (or Y-axis as the case may be). If driving units 30 are superimposed perpendicularly as in FIG. 1, there is an area for movable positioning, having a length and width.

On the sides of the pair of the guides 33 that face one another, two magnet rows 38 are provided. Each magnet row 38 comprises a plurality of magnets 35 respectively formed in the shape of a plate and a plurality of spacers 36 made of non-magnetic material, also respectively formed in the shape of a plate. Each magnet row 38 is arranged with magnets 35 and spacers 36 placed alternately. An air flow path 37, which is a second air flow path for cooling, is formed between one side of the guide 33 and the magnet row 38 that is attached on said one side.

An air blower 41 for intake can function as a first air supply means, and/or an air blower 42 for exhaust can provide the first air supply means, or both. The blower(s) are provided at one or both ends in the longitudinal direction of the channel 34 (in the arrow X (or Y) direction). A cover 45 in the shape of a band made of metal is provided, closing over the top of the channel 34. The space in the channel 34 of the stationary member 31 is enclosed by a guide body 32, a pair of the guides 33 and preferably a pair of air blowers 41, 42. This enclosure encompasses the positioning area ARA of the moving member 51. An air flow path 39, namely a first air flow path for cooling, is provided, having a cross section bounded by the channel 34 and the cover 45. This air flow path 39 extends along the magnets 35 of the stationary member side and is subjected to a forced air flow by the air blowers 41, 42 in the preferred embodiment shown. Either a supply blower or exhaust blower, or both of the air blowers 41, 42, may produce this air flow.

An air purifying means 43 preferably is located between the air flow paths 37, 39 and the air blower 41. This air purifying means 43 comprises a dust filter in the shape of a flat plate stacked or superimposed with a magnetic separator in the shape of a flat plate, the latter for removing magnetic metal powder. The air purifying means 43 catches and removes dust and magnetic metal powder in the air supplied from the air blower 41 to the air flow paths 37, 39. This maintains clean conditions in the air flow path 39, even if the unit is used in a place where the ambient air is laden with foreign objects such as dust and magnetic metal power, for example as in a machine tool plant.

In the embodiment shown in FIG. 2, the air purifying means 43 is located on the downstream side of the air blower 41. Similar cleaning effects can be obtained if the air purifying means 43 is located on the upstream side of the air blower 41. In any event, the first air supply means preferably may be comprised of an air blower 41 and an air purifying means 43, united with each other to prevent dust and particularly magnetic metal particles, from entering the cooling air flow and accumulating on the magnets or otherwise.

The moving member 51 has a movable base 52 slidably located in the channel 34. A plurality of coil cores 54 (five on each side being shown in FIG. 2) are stacked in fixed position on movable base 52, and interact with electromagnetic coils 53 on both ends that face the rows 38 of magnets that are fixed in place on guide 33 of stationary member 31. An air flow path 55, which is a third air flow path for cooling, is formed to extend through the coil cores 54, including in the stacking direction of the coil cores 54 (up and down in FIGS. 2 and 3) and along its center portion.

A guide plate 56 is fixed on the end portion of movable base 52 on the side closest to the air blower 41. The guide plate 56 contacts the end of the stacked electromagnetic coils 53 and coil cores 54. Air supplied from the air blower 41 into the channel 34 is guided along a guide flow path 62 described hereinafter.

A slider 57 is mounted on the movable base 52 over the coil cores 54, putting the electromagnetic coils 53 and the coil cores 54 between the slider 57 and the base 52. An end portion 57a projects downwardly from slider 57 on the end closest to the air blower 42, around the end portions of the electromagnetic coils 53 and the coil cores 54 on that side.

A guide flow path 61 communicating with the third air flow path 55 is formed along the coil cores 54, extending in the X (or Y) axis direction, that is, extending in the direction of positioning of the movable base 52. The cross section of this air flow path 55 extends from the movable base 52 and encompasses the electromagnetic coils 53 and the coil cores 54 and areas at both right and left sides in the figure that are sandwiched by the coils 53. The guide flow path 61 communicates with the air blower 42 through the channel 34. The channel is divided in two when the moving member 51 is at an intermediate position in the X (or Y) axis positioning direction. That is, one end of the channel 34 is in front of the moving member 51 in the positioning direction, and the other end of the channel 34 is behind the moving member 51. Therefore, changing the position of the moving member 51 moves guide flow path 61 back and forth along the air flow path 39.

A guide flow path 62 communicating with the third air flow path 55 also is formed in the coil core 54 and extends in the X (or Y) axis direction, that is, in the moving or positioning direction of the movable base 52, below the slider 57 and in the area of the electromagnetic coils 53 and the coil cores 54. Guide flow path 62 also is defined such that on both the right and left sides in the figure, the guide flow path is sandwiched by the electromagnetic coils 53. The guide flow path 62 communicates with the air blower 41 through the channel 34, which as mentioned above is separated into the ends that are in front of moving member 51 and behind moving member 51 in the moving or positionind direction. Therefore, changing the position of the moving member 51 also moves guide flow path 62 back and forth along air flow path 39.

In this way, upper and lower guide flow paths 61, 62 in FIG. 2 are formed, encompassing the coil cores 54 on both sides and in the stacking direction of the coil cores 54. The front and rear sides of the air flow path 39, on opposite sides of the moving member 51 in the positioning direction, are coupled with each other by the guide flow paths 61, 62 through the moving member 51 and with the air flow path 55.

A slit 63 is formed at the slider 57, extending through in the positioning direction (in the arrow direction, which may be X or Y). A cover 45 extends through the slit 63 so as to permit relative movement. A pair of supporting members 64 are fixedly provided at both ends of the slider 57 in the moving direction. Supporting members 64 carry a pair of rotatable guide rollers 65, 66, on rotation axes perpendicular to the moving direction of the moving member 51.

Each guide roller 65, located nearer to the slider 57, guides the cover 45 extending into the slit 63 of the slider 57, preferably such that the cover does not contact the edge of the inlet of the slit 63. Each guide roller 66, located farther from the slider 57, guides the cover 45 so as not to raise the cover 45 from an end face 33a of the guide 33 when approaching.

In the case of the drive unit 30A, the moving body 6 is fixed on an end face 57b of the slider 57. In the case of the drive unit 30B, the head unit 10 is fixed on the end face 57b of the slider 57.

Alternating current is applied to the electromagnetic coils 53, for generating magnetic force, to pull or to repel the moving member 51 and associated slider 57 relative to the adjacent magnets 35, thereby adjusting the position of the moving member in the arrow X (or Y) direction.

When the moving member passes a given point, the cover 45 is separated from the top edge of guide 33, and carried along the guide rollers 66, 65 into the slit 63 of the slider 57, without contacting with the opening portion of the slit 63 due to guidance from the guide roller 65.

On the other end, the cover 45 emerging from the slit 63 is guided onto the guide roller 65 at the rear end of the moving member 51 in the direction of motion, and emerges from the slider 57 without contacting with the edges of the slit 63. The cover 45 is guided onto the guide roller 66, which then holds the cover 45 down, so as to contact the end face 33a of the guide 33 and closely cover the air flow path 39 in the channel of the stationary member 31.

The inside of the channel, namely air flow path 39, is supplied with air for cooling from the air blower 41 for intake, and/or the air in the air flow path 39 is exhausted by the air blower 42, or both. A pressure difference can occur, for example, the pressure of the air in the air flow path being positive relative to ambient on the upstream or air blower 41 side of the moving member 51, and negative on the downstream suction side of blower 42.

Due to the pressure difference, air 20 supplying the air flow path 39 from the air blower 41 streams past the moving member 51 to the air blower 42, including passing through the clearance between the stationary member 31 and the moving member 51 and through the air flow paths provided in member 51. In this process, part of the air supplied in the air flow path 39 from the air blower 41 passes through the air flow path 37, between the guide 33 and the magnet row 38 so as to cool the magnet row 38 from the back. This air is exhausted into the atmosphere from the air flow path 39 by the suction air blower 42. For this purpose, air may be supplied directly from the air blower 41 to the air flow path 37 with appropriate channeling, and likewise may be exhausted from the air blower 42 directly. Alternatively, another air supply means may be provided in addition to the air blowers 41, 42.

Another part of the air supplied in the air flow path 39 passes through the clearance formed between the moving member 51 and the channel 34 so as to cool the magnet row 38 from its inside surface. This air also cools the electromagnetic coils 53 and the coil cores 54 of the moving member 51 from the outside. This air also is exhausted into the atmosphere from the air flow path 39 by the air blower 42.

Still another part of the air supplied in the air flow path 39 from the air blower 41 streams into the guide flow path 62 along the guide plate 56, and passes through the air flow path 55 formed in the coil core 54 from the guide flow path 62. This flow streams through the guide flow path 61 so as to cool the coil core 54 from the inside as shown in FIG. 3. That air too is exhausted in the atmosphere from the air flow path 39 through the air flow path 39 with the air blower 42.

According to the above-mentioned embodiment, the magnet row 38 is cooled from its surface and its back. The electromagnetic coils 53 and the coil cores 54 are cooled from their surfaces and their inner faces. Any increase in temperature owing to the heating of the magnet 35 or the electromagnetic coil 53 and the coil core 54 can be effectively controlled. The displacement of elements induced by heat generated in a machine tool that is positioned in this way can be made small. The machining accuracy of the machine tool can be improved.

The air flow path 55 formed in the coil core 54 does not have to have a particular shape such as a circle. However, a circular hole successively providing a wing 55a, projecting on the electromagnetic coil 53 side, is shown in FIG. 3. The air flow path 55 has the corresponding shape, which increases the area of contact between the coil core 54 and the air, to improve cooling efficiency.

Figure 4:
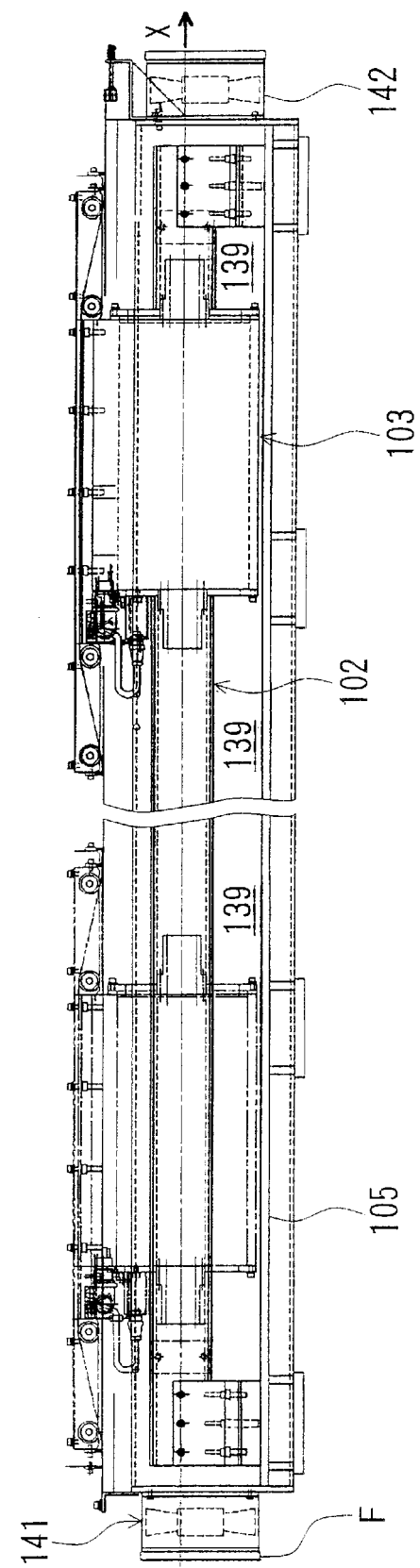
FIG. 4 is a longitudinal section showing an example of the whole structure of a linear motor according to the invention.

A second embodiment of the invention will now be explained, referring to FIGS. 4 through 11. FIG. 4 is a longitudinal section showing an example of the overall structure of the linear motor according to the invention, and FIG. 5 is a detailed longitudinal section of the embodiment shown in FIG. 4.

As shown in FIG. 4, a linear motor 101 has a stationary member 102 having a thin and long shape (almost a bar shape). A cylindrical moving member 103 is fitted in the stationary member 102, with clearance permitting sufficient play that the moving member is free to move. As shown in FIG. 5, a plurality of permanent magnets 120 are located on the stationary member 102 along an axial direction X. Armatures 130 are located on the moving member 103 so as to respectively face the permanent magnets 120, being spaced by a small distance therebetween. The linear motor 101 thus has such a structure that a force is generated between the magnet 120 and the armature 130 by switching electric power to the armature 130. The force is used to move the moving member 103 relative to the stationary member 102.

Figure 5:
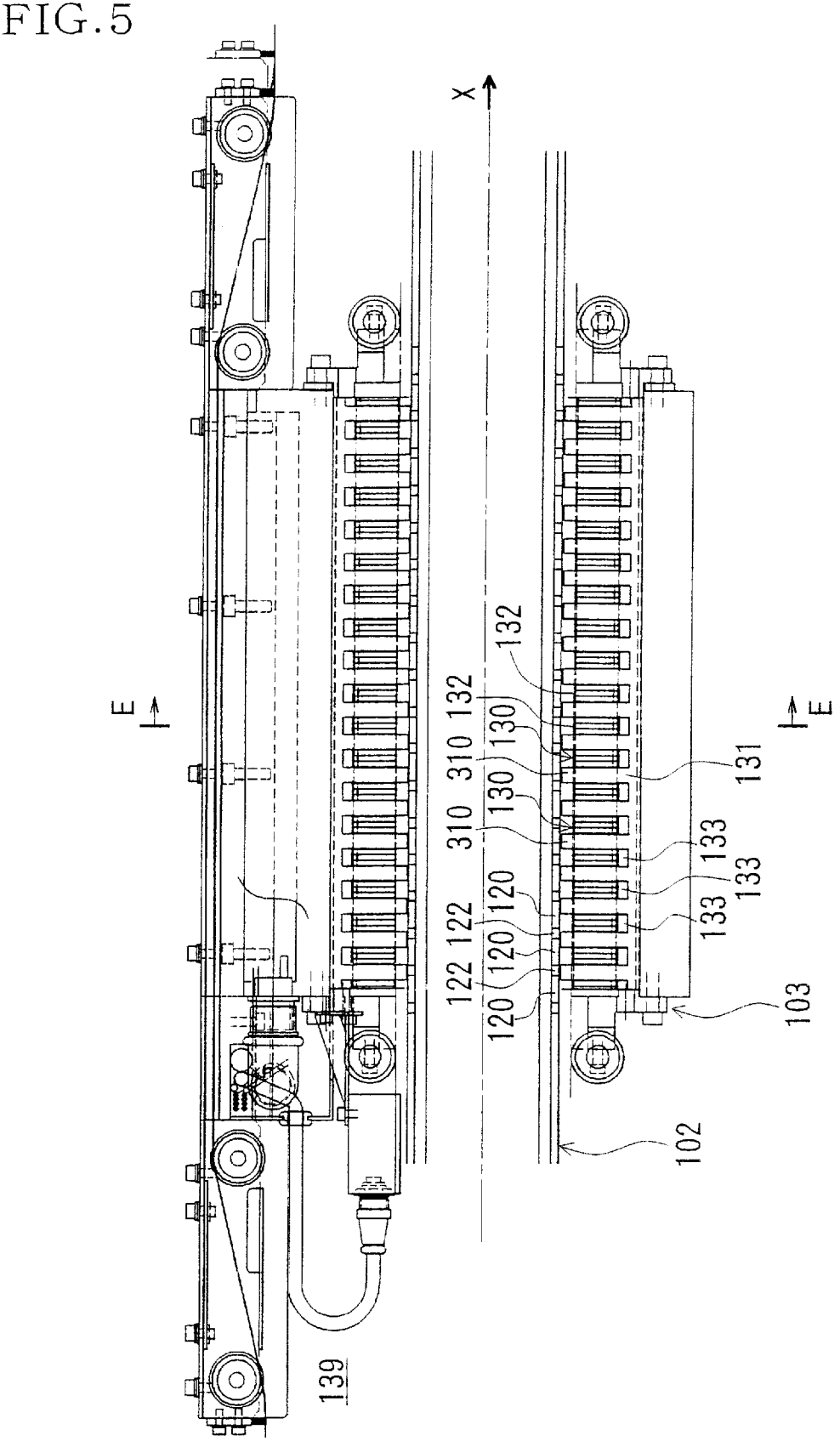
FIG. 5 is a detailed longitudinal section of FIG. 4.
Figure 6:
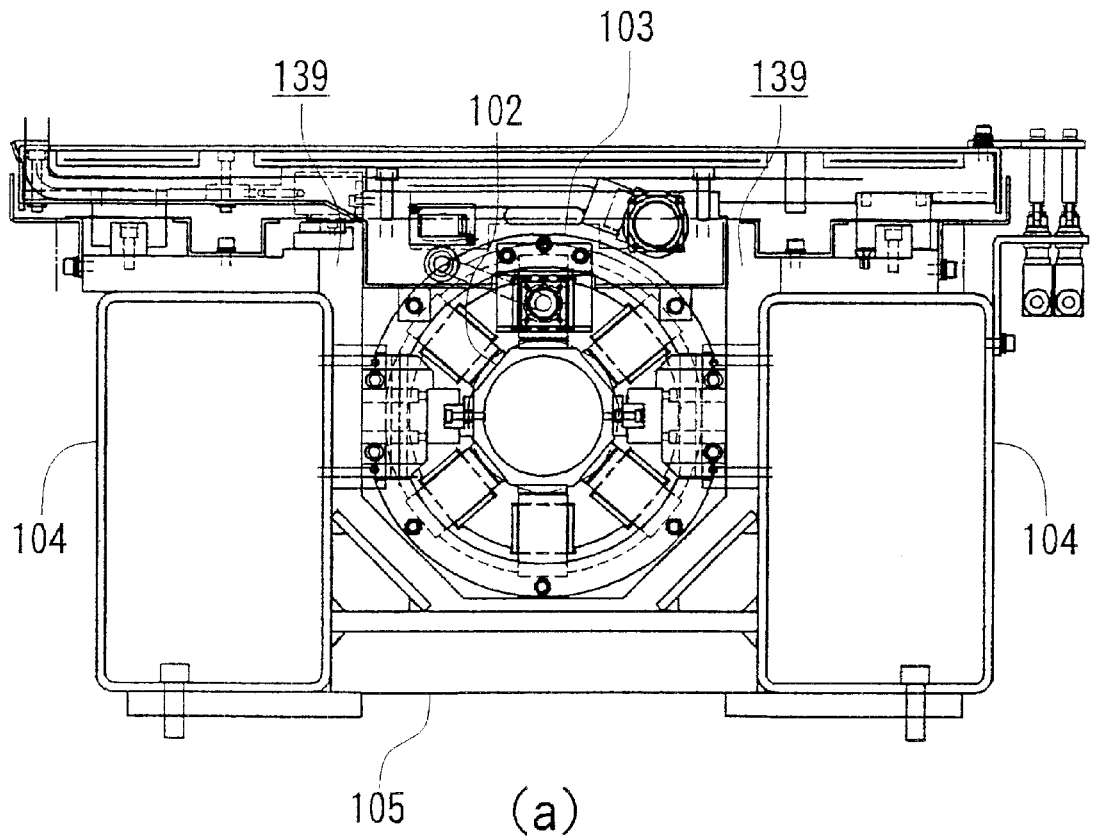
FIG. 6($a$) is a sectional view from line E—E of FIG. 5.
Figure 6:
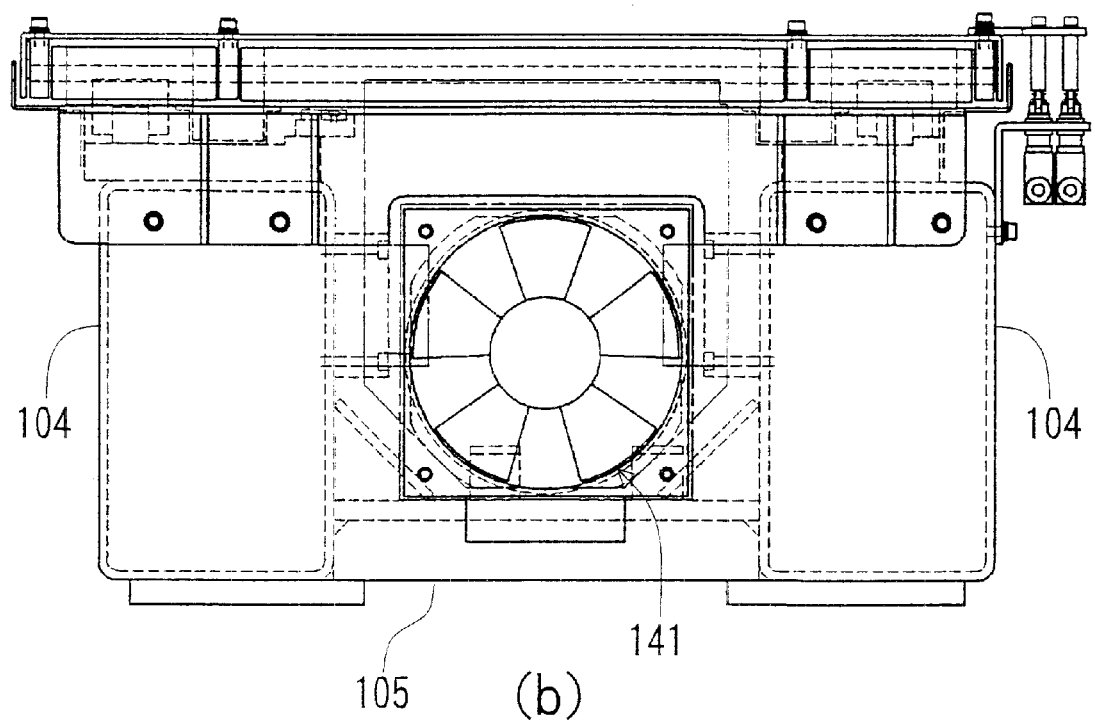

FIG. 6(a) is a sectional view along line E—E in FIG. 5, and FIG. 6(b) is a view showing an air blower 141 or the like, as seen from a side of the linear motor. As shown in FIG. 6, frames 104, 104 and a base plate 105 are located along the axial direction X, enclosing the stationary member 102 and the moving member 103 so as to form an air flow path 139 (namely a first air flow path for cooling). At one end of the air flow path 139, the air blower 141 for intake (a first air supply means) and a filter F are located, and at the other end, an air blower 142 for exhaust (also or alternatively part of the first air supply means) is provided. One or more such blowers 141, 142 supply the air flow path 139 with an air flow. That is, the air flow path 139 extends along the magnets 120 on the stationary member side in the embodiment shown. The moving member 103 moves in the air flow path 139.

Figure 7:
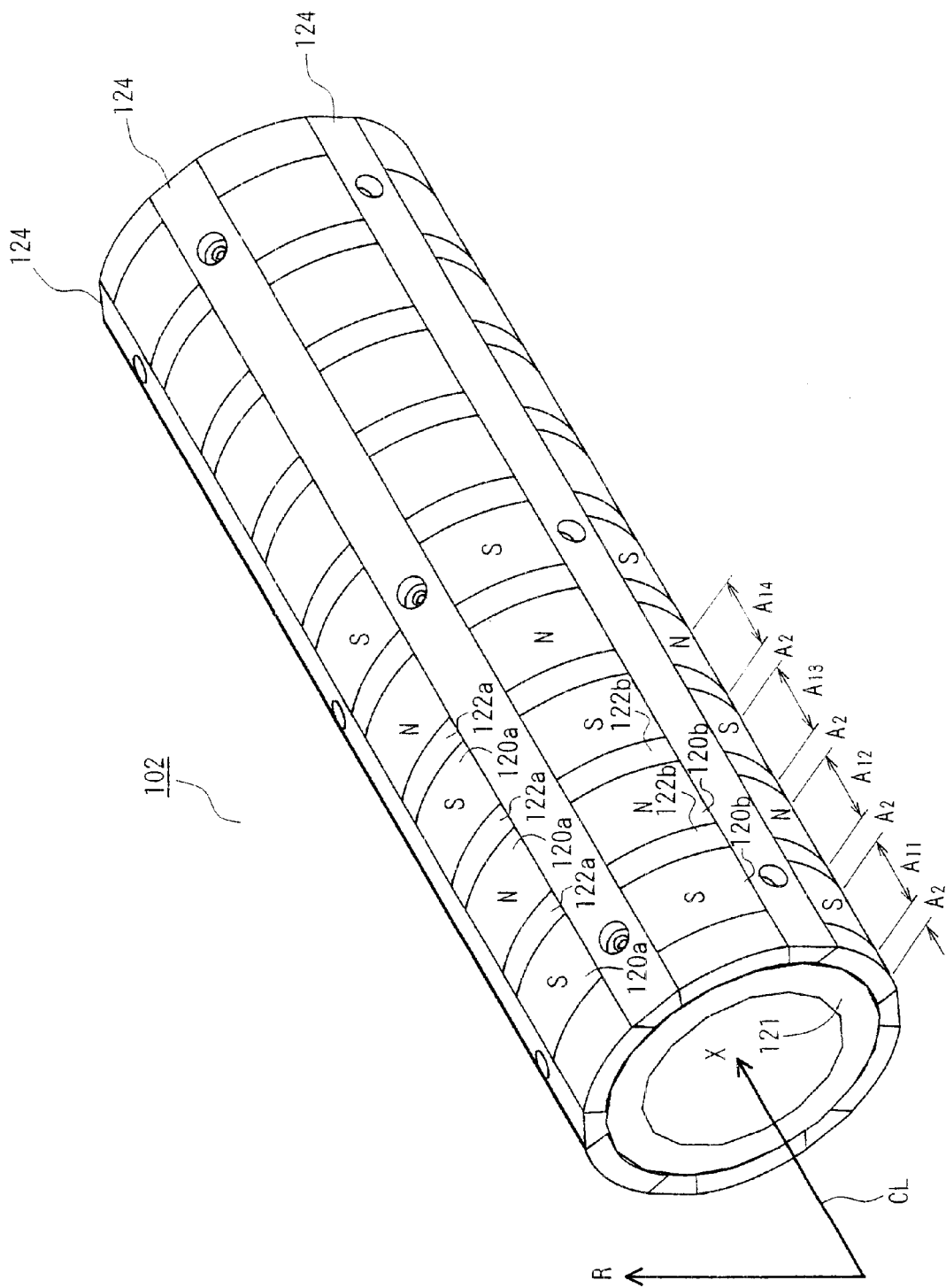
FIG. 7 is a perspective view showing an exemplary stationary member.
Figure 8:
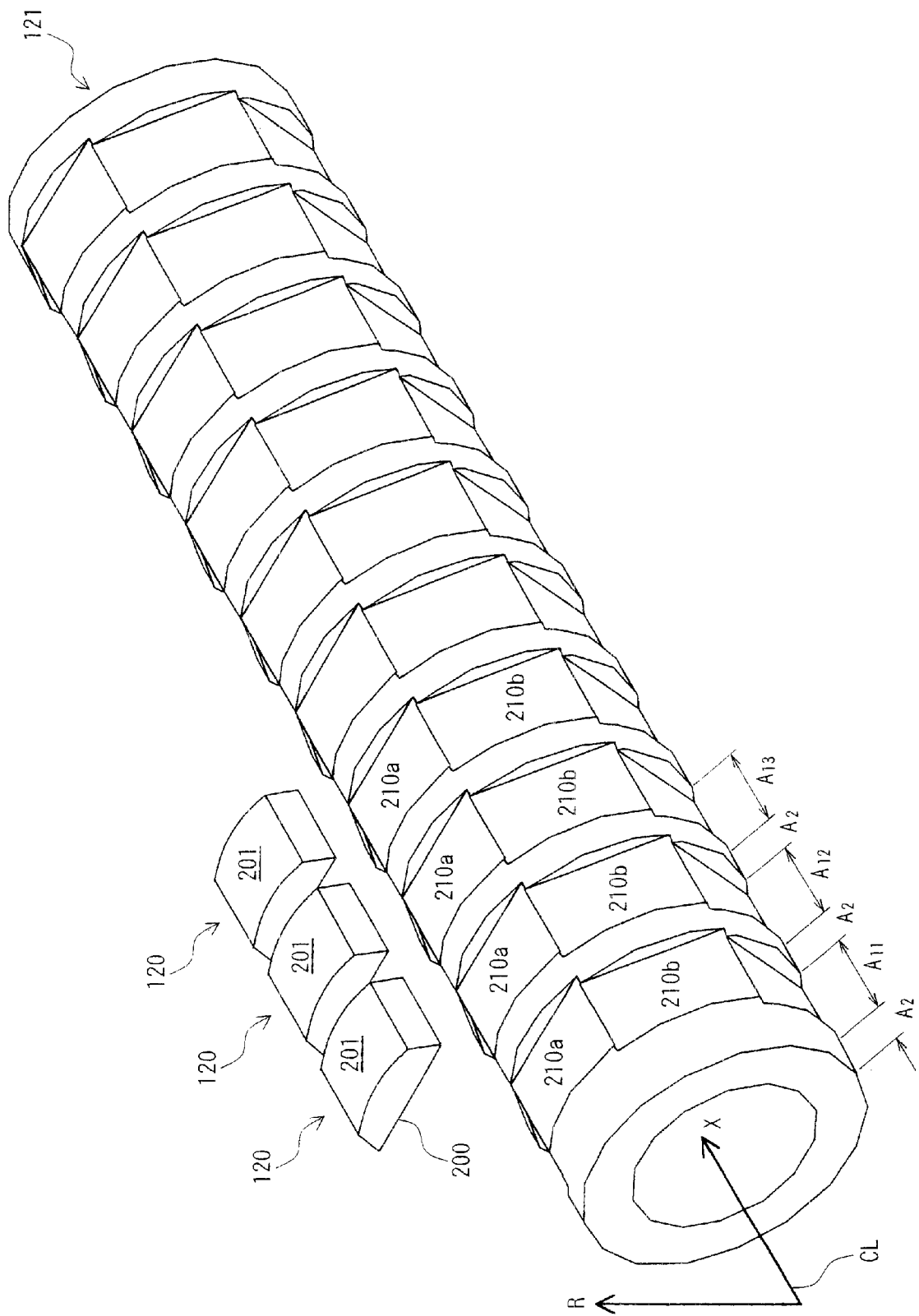
FIG. 8 is a perspective view showing an exemplary base portion.

FIG. 7 is a perspective view showing the stationary member 102. FIG. 8 is a perspective view showing a base portion.

The stationary member 102 has a slender base portion 121 having an almost cylindrical shape, as shown in FIGS. 7 and 8. The shape of the base portion 121 includes an outer peripheral face comprising six plane portions 210a, 210b, . . . , whereby this portion has almost a hexagonal pole appearance. A plurality of these portions are located along the axial direction X as shown by $A_{11}, A_{12}, A_{13}, \ldots$ in FIG. 7. These portions are similar and portion "$A_1$" is explained and can be considered the portion under discussion unless otherwise identified. The portion for mounting the magnet 120, referred to as the "magnet installation portion," and the portion $A_2$, having almost a cylindrical appearance ("annular portion $A_2$" hereinafter) are alternately located. The permanent magnets 120 (or as separately differentiated on their specific plane portions 210a, 210b, . . . , as magnets 120a, 120b, . . . etc.) are permanent magnets 120 located at a predetermined pitch in the axial direction X of the stationary member 102 (that is, the longitudinal extension of the stationary member 102, which is also the direction of moving the moving member 103) so as to form a magnet row (for instance, the magnet row of successive magnets 120a, 120a, 120a, . . . ) (see FIG. 7). Around the central axis CL, six such magnet rows are radially symmetrically located (see FIG. 9).

Figure 9:
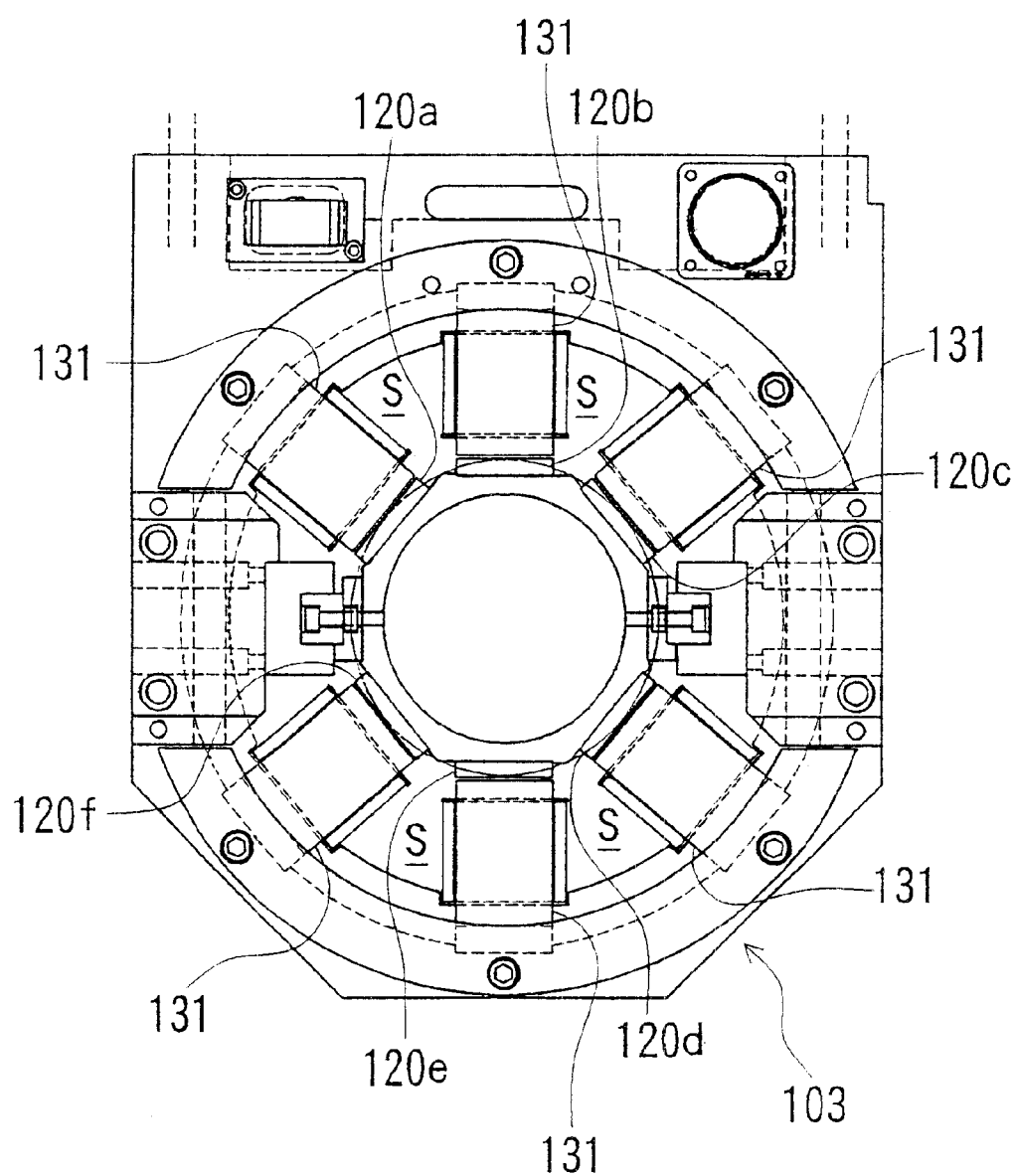
FIG. 9 is a detailed view corresponding to FIG. 6($a$)

FIG. 9 is a detailed view corresponding to FIG. 6(a). The "symmetrically" located magnets refers to the central axis CL and means that the magnet rows, or the corresponding armature rows, are located a a constant central angle spacing (every 60° in case of the figure) in the cross section as shown in FIG. 9. In the example, six permanent magnets 120a, 120b, . . . located on one magnet installation portion A1 are set such that the magnetic poles of an outer peripheral face 201 are at the same relative position and the magnetic poles on the outer peripheral face 201 are alternately switched, such as S-N-S-N-S-N, proceeding in the axial direction X. That is, the stationary member 102 as shown in FIG. 7 has magnetic poles on the outer peripheral face 201 that are all S poles as shown at reference $A_{11}$, and the magnetic poles on the outer peripheral face 201 are all N poles at reference $A_{12}$, S poles at reference $A_{13}$, N poles at reference $A_{14}$, and so forth. This alternating arrangement of the poles of the permanent magnets 120 is such that two magnets adjacent to each other in the axial direction X pull toward each other, which makes it easy to attach the magnet 120 to the base portion 121, and easy to assemble the stationary member 102.

A spacer 122 is located on the annular portion $A_2$ so as to occupy a gap between the magnets 120, 120 in the axial direction X, as shown in FIG. 5 and FIG. 7. Reference number 124 in FIG. 7 refers to a fixing bar for fixing the permanent magnet 120 and the spacer 122, pressing both ends of these (both end faces in the peripheral direction) down to the base portion 121.

Figure 10:
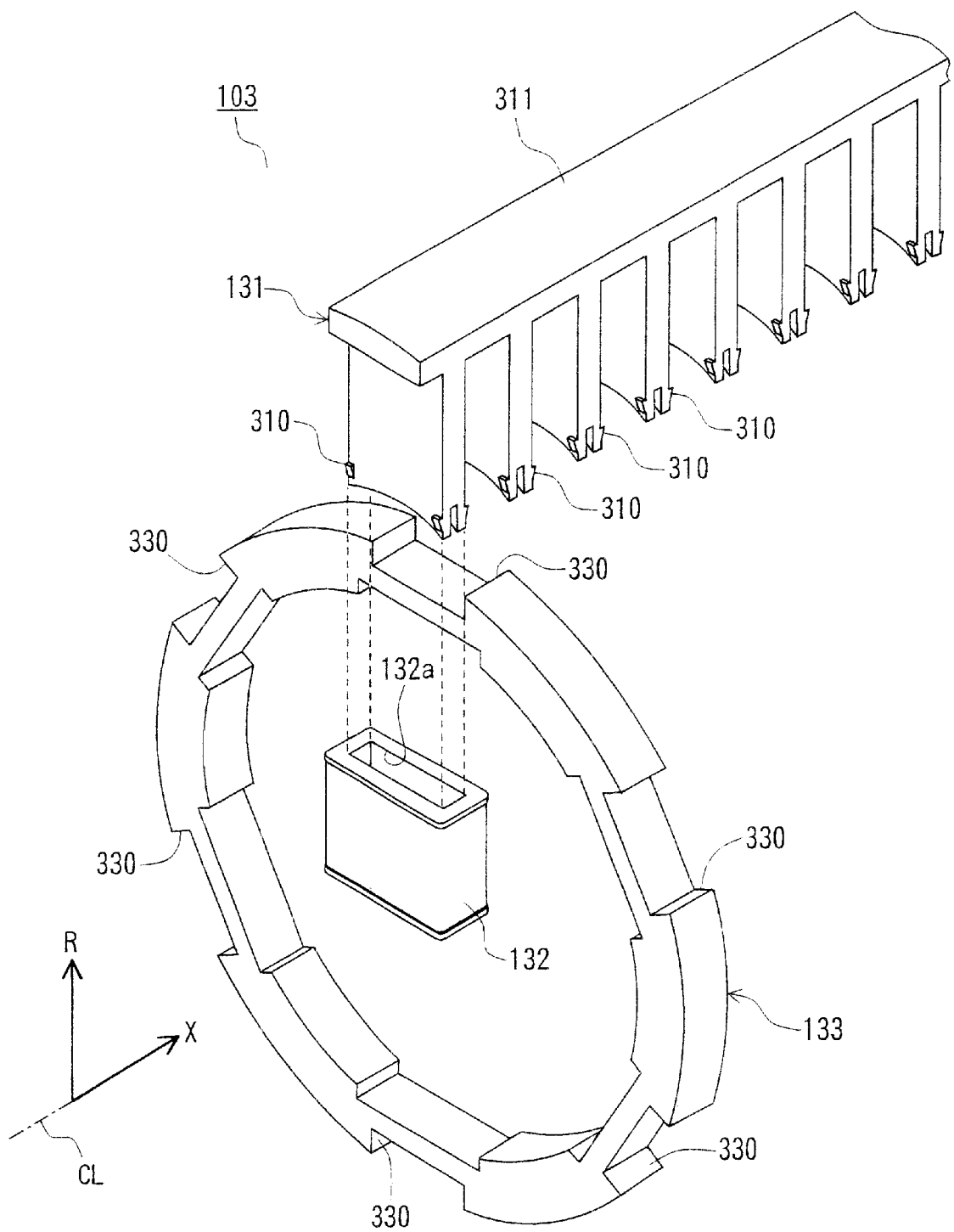
FIG. 10 is an exploded perspective view showing certain structures of a moving member.

The moving member 103 is explained with reference to FIGS. 9 through 11. FIG. 10 is a broken away perspective view showing the moving member 103, and FIG. 11 is a perspective view showing the moving member 103.

The moving member 103 has six iron core members 131, as shown in FIG. 9, arranged to face the six magnet rows 120a, . . . , 120b, . . . , 120c, . . . , 120d, . . . , 120e, . . . , 120f, . . . , on the stationary member side. Each iron core member 131 has a comb shape, comprising a portion 311 arranged along the axial direction X (the "back portion" hereinafter) and a plurality of iron core portions 310 arranged on the central axis CL hand from the back portion 311, as shown in FIGS. 10 and 11. A coil 132 is coupled with each iron core portion 310 so as to form an armature 130. A plurality of armatures 130 are arranged in the axial direction X (that is, the longitudinal extension of the stationary member 102 and the direction of movement of the moving member 103). The armatures face the magnet rows (for instance, the magnet rows of the mark 120a, . . . ), each being radially and symmetrically arranged in corresponding rows of magnetic and armature poles, around the central axis CL. An air flow path as shown by a mark S in FIG. 9 (which is a fourth air flow path for cooling) is formed between the respective armature rows and/or armature poles. This air flow path S extends along the axial direction X, and both end portions of path S are open so as to communicate with the air flow path 139 on the stationary member side. When the air flow path 139 on the stationary side is supplied with an air current from the air blowers 141, 142, the air flow enters a passes through air flow path S on the moving member side and cools the armature 130. Only one of the six iron core members 131 is shown in FIGS. 10 and 11. Only one coil 132 is shown in FIG. 10 and only two armatures 130 are shown in FIG. 11.

Figure 11:
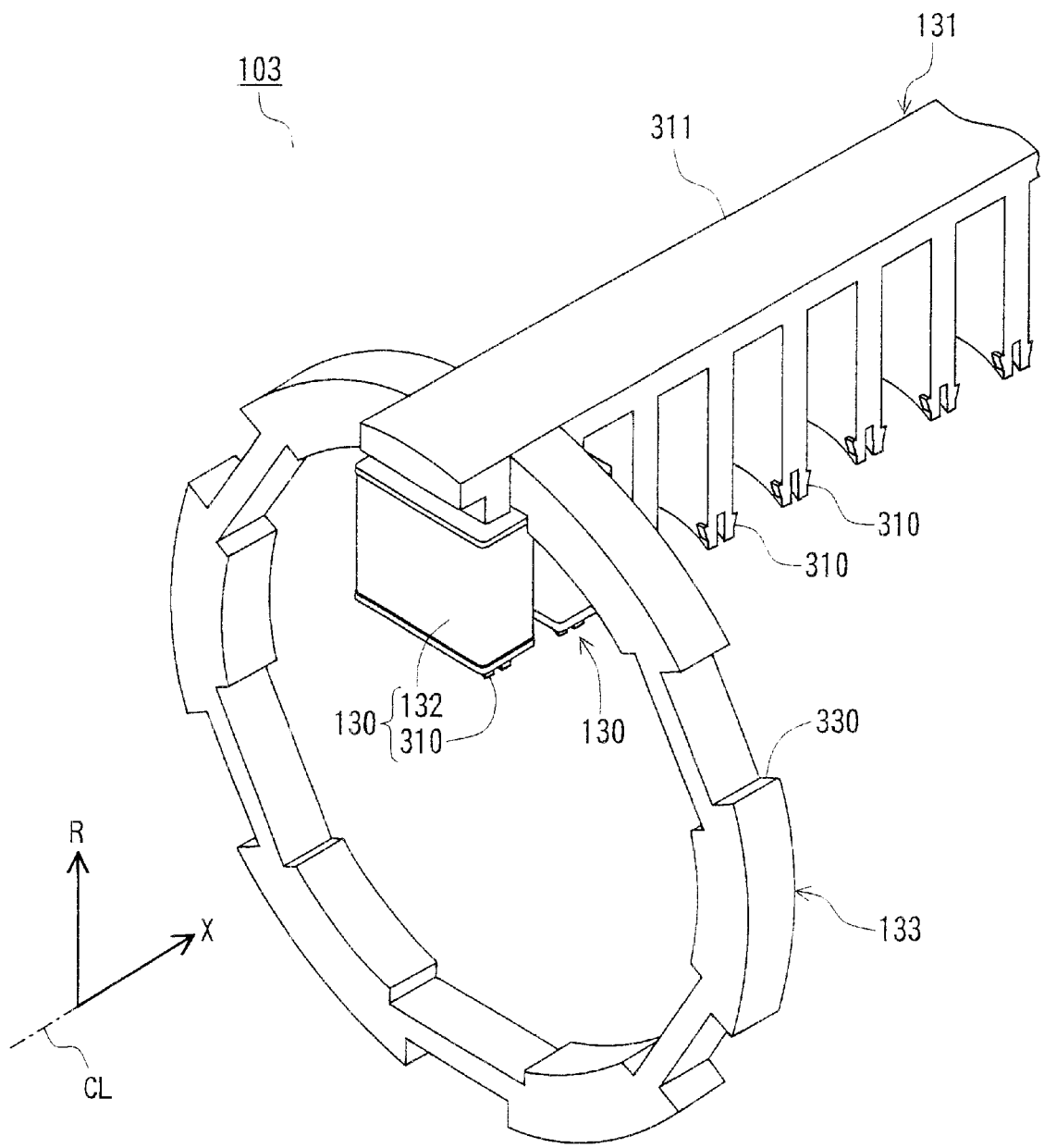
FIG. 11 is a perspective view further showing structures of the moving member.

As shown in FIG. 5, the moving member 103 has a plurality of annular members 133, shown in detail in FIGS. 10 and 11. On the outer peripheral side of the annular member 133, six channel portions 330 ("outside channel portions" hereinafter) are formed at equal intervals, and the back portion 311 of the iron core member 131 is inserted in each outside channel portion 330 from its outside (from the outside of the annular member 133), as shown in FIGS. 10 and 11. As shown in FIG. 5, the annular member 133 is always located between the iron core portions 310, 310. Only one exemplary annular member 133 is shown in FIGS. 10 and 11 for clarity. In this embodiment, the gap between the iron core portion 310 and the permanent magnet 120 can be properly maintained because the iron core member 131 is supported by the annular member 133. The iron core portion 310, extending toward the permanent magnet 120 on the stationary member side, is pulled toward the permanent magnet 120 with a substantial force. The iron core member 131 is attached to the annular member 133, via the outside channel portion 330. The positioning shift in the peripheral direction (peripheral relative to annular member 133) is made a minimum so as to correctly radially locate the members as shown in FIG. 9. No adhesive is required for attachment of the iron core member 131 to the annular member 133. Thus, no time is needed for drying and assembly work is minimal.

When voltage is successively applied to coils 132 with a predetermined timing so as to excite the armature 130, attraction and repulsion force acts between the armatures 130 and the permanent magnets 120 so as to move the moving member 103 in the axial direction X of the stationary member 102. The moving member 103 is moved along the stationary member 102, making use of the forces generated between the magnets 120 and the armatures 130.

Besides, the air flow paths 139, S are supplied with an air flow current when the air blowers 141, 142 are driven so as to cool the stationary member 102 and the moving member 103.

In the embodiment described, the magnet 120 is located on the stationary member side and the armature 130 is located on the moving member side, but these respective locations of the magnet and armature are not limiting and could be reversed so that one or more of the magnets 120 is located on the moving member side, and the corresponding armature 130 is on the stationary member side.

In the embodiment described, one air blower 141 and one air blower 142 are located at the opposite ends of the air flow path 139. This arrangement also is not limiting. Only one air blower may be provided for supply or exhaust. The air blower(s) may be located at an intermediate the portion excluding the ends of the path.

Furthermore, the air supply means for supplying the air flow paths 39, 55, 61, 62, 139 with a cooling air curent, such as a cooling fan and a cooling air supply nozzle may be provided on the moving members 51, 103 such that the air flow paths 39, 55, 61, 62, 139 and S can be supplied with air flow (air for cooling) from air supply means provided on the moving member 51, 103 in addition to locating on the end portion of the air flow paths 39, 55, 61, 62, 139. Besides, an air supply port of the air supply means may be opened in the air flow paths 55, 61, 62 and S formed in the moving member 103 so as to firstly supply the inside of the air flow paths 55, 61, 62 and S on the moving member side with dry air for cooling supplied from the air supply means such that the armatures 53, 54 and 130 can be effectively cooled.

In this embodiment, cooling air flow paths are located on the stationary member side (see the mark 139) and on the moving member side (see the mark S). It would be possible to use only one side, e.g., only the stationary member side.

As described, six magnets 120 are provided around the cross section of the stationary member 102. A different number of magnets is possiblel.

The exemplary stationary member 102, base portion 121 and magnet arrangement 120 has a cylindrical shape. This shape is not limiting. For example, the shape may be a polygon. The stationary member 102 (or more particularly, the base portion 121) is a hollow cylinder, but could be a solid bar.

The exemplary magnet rows and armature rows are symmetrically located with respect to the central axis CL of the stationary member 102. That is, the rows are evenly spaced at a constant angle from one another around the cross section as shown in FIG. 9. A non-symmetrical arrangement around central axis CL is also possible.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. A linear motor having a stationary member and a moving member located so as to face each other and so as to move said moving member along said stationary member, making use of a force generated between a magnet and an armature, said linear motor comprising:

said stationary member having a slender shape;

said moving member having a cylindrical shape and being fitted on said stationary member with clearance permitting movement relative to the stationary member;

said armature being located on a side of the moving member and said magnet being located on a side of the stationary member, wherein said magnet comprises at least one row of magnet poles disposed along a longitudinal direction of the stationary member, and said armature comprises at least two rows of armature poles that are adjacent to one another, the armature poles being disposed along the longitudinal direction for interaction with the magnet poles;

a first air flow path for cooling being formed to extend along said row of magnet poles on the side of the stationary member;

a further air flow path for cooling being defined between said at least two rows of armature poles that are adjacent to one another;

wherein said first air flow path for cooling is supplied with air flow by a first air supply means that introduces the air flow into said first air flow path for cooling, and wherein said air flow passes through the further air flow path so as to cool said armature located on the side of the moving member.

2. The linear motor according to claim 1, wherein said moving member is moved along said first air flow path for cooling by the force generated between the magnet and the armature.

3. The linear motor according to claim 1, wherein the first air supply means comprises a forced air means located on each of both ends of said first air flow path for cooling.

4. A linear motor wherein a moving member having a coil core, on which an electromagnetic coil is provided, runs in a movement area in the shape of a channel at a stationary member having a magnetic row so as to move and drive a movable member fixed on said moving member, and said linear motor comprises:

a first air flow path for cooling formed in said movement area a first air supply means for supplying air for cooling, the first air supply means comprising at least one of an intake air blower and an exhaust air blower, mounted at least at one end of said first air flow path for cooling.

5. The linear motor according to claim 4, wherein the first air supply means for supplying air for cooling comprises both the intake air blower and the exhaust air blower, spaced from one another to define opposite ends of said first air flow path for cooling.

6. The linear motor according to claim 4, wherein a second air flow path for cooling is formed between a supporting member for supporting a magnet row of said stationary member and said magnet row, and a second air supply means supplies air to said second air flow path for cooling said magnet row.

7. The linear motor according to claim 4, wherein a third air flow path for cooling is formed in a coil core of said moving member so as to penetrate said coil core in a stacking direction thereof, so as to stream air over the coil core for cooling.

8. The linear motor according to claim 7, wherein a pair of guide air flow paths are formed on both sides of said stacking direction of said coil core, and wherein the pair of guid air flow paths communicate with each other through said third air flow path for cooling.

9. The linear motor according to claim 8, wherein one of said pair of guide air flow paths on one side of said stacking direction of said coil core communicates with said first air flow path for cooling at one of a front and a rear of said moving member in a moving direction, and another of said pair of guide air flow paths on an other side of said stacking direction of said coil core communicates with said first air flow path for cooling at the other of said front and said rear of said moving member in the moving direction, the moving member dividing said first air flow path for cooling between the front and rear, and wherein movement of the moving member along the moving direction causes air flow to move between said first air flow path for cooling and said guide air flow paths.

10. A linear motor, comprising:
   a stationary member having a channel and magnet rows respectively arranged at inner side faces of said channel, facing each other;
   a moving member between said magnet rows of said stationary member, the moving member being arranged for movement along said magnet rows;
   a cover comprising a band arranged so as to close over an opening portion of said channel of said stationary member;
   a first air flow path for cooling being defined between said channel and said cover;
   said moving member being formed with a slit extending through the moving member in a direction of movement of the moving member;
   wherein the cover extends through the slit of the moving member, freely for relative sliding movement between the moving member and the cover;
   a pair of guide rollers at each opposite end of the moving member in the direction of movement, each said pair of guide rollers including a guide roller nearer to the moving member for guiding the cover relative to the slit, and a guide roller farther from the moving member for guiding the cover to close over the opening portion of the channel.

11. The linear motor according to claim 10, wherein a first air supply means supplies said first air flow path for cooling with a current of air for cooling, the first air supply means being provided at least at one end of said first air flow path for cooling.

12. The linear motor according to claim 6, wherein said first air supply means is coupled with said second air supply means.

13. The linear motor according to claim 11, wherein said first air supply means comprises an air blower and an air purifying means for passing through an air supplied by said air blower, the air purifying means removing foreign objects in the air.

14. A linear motor, comprising:
   a stationary member having a channel and magnet rows respectively arranged at inner side faces of said channel, facing each other;
   a moving member between said magnet rows of said stationary member, the moving member being arranged for movement along said magnet rows;
   a cover arranged so as to close over an opening portion of said channel of said stationary member;
   a first air flow path for cooling being defined between said channel and said cover;
   a first air supply means for supplying a flow of cooling air passing along the first air flow path, said first air supply means comprising a blower and an air purifying means for removing foreign objects from air supplied by the blower, and wherein said air purifying means comprises means for removing magnetically attracted metallic powder from the air supplied by the blower.

15. A linear motor having a stationary member and a moving member facing the stationary member, the moving member being arranged to move along the stationary member by a force generated between a magnet and an armature, said linear motor comprising:
   a first air flow path for cooling being formed along at least one of the magnet and the armature, on a side of the stationary member;
   a first air supply means provided on said moving member; and,
   wherein the first air flow path for cooling is supplied with a cooling air flow by said first air supply means.

16. The linear motor according to claim 1, wherein said first air supply means supplies said air flow path formed in said moving member with a cooling air flow.

* * * * *